United States Patent [19]
Black et al.

[11] Patent Number: 4,563,380
[45] Date of Patent: Jan. 7, 1986

[54] FASTENER ASSEMBLY WITH IMPROVED TEMPORARY ATTACHMENT LAYER

[75] Inventors: Philip D. Black, Hudson, Wis.; Dale G. Rhoe, Maplewood, Minn.

[73] Assignee: Minnesota Mining and Manufacturing Company, Saint Paul, Minn.

[21] Appl. No.: 646,900

[22] Filed: Aug. 31, 1984

Related U.S. Application Data

[63] Continuation-in-part of Ser. No. 629,330, Jul. 10, 1984, abandoned.

[51] Int. Cl.$^4$ .................................................. A44B 21/00
[52] U.S. Cl. .................................. 428/100; 428/308.4; 428/311.1; 428/317.1; 428/329; 428/900; 428/120; 24/306; 24/444; 264/46.7
[58] Field of Search ................ 428/100, 900, 308.4, 428/311.1, 317.1, 329, 120; 24/306, 444; 297/DIG. 6; 264/46.7

[56] References Cited

U.S. PATENT DOCUMENTS 4,454,183 6/1984 Wollman ................................ 428/92
4,470,857 9/1984 Casalow ............................ 24/306 X Primary Examiner—Alexander S. Thomas
Attorney, Agent, or Firm—Donald M. Sell; James A. Smith; William L. Huebsch

[57] ABSTRACT

An elongate fastener assembly comprising a flexible polymeric backing strip from which project a multiplicity of headed stems adapted to engage loops on materials pressed against the heads, and an open porous permanent attachment layer attached to the surface of the backing strip opposite the stems which has sufficient open area to receive foam to permanently attach the fastener assembly to a foamed article. The fastener assembly has a temporary attachment layer comprising granular ferromagnetic material in a polymeric binder sandwiched between the backing strip and the permanent attachment layer which is adapted to be attracted by magnets to temporarily hold the fastener assembly in position during a foaming process, and has a heat shrinkable film cover means overlaying the heads attached to the edges of the backing strip that will shrink transversely to expose the heads upon the application of heat below 125° C.

4 Claims, 4 Drawing Figures

FASTENER ASSEMBLY WITH IMPROVED TEMPORARY ATTACHMENT LAYER

CROSS REFERENCE TO RELATED APPLICATION

This is a continuation-in-part of U.S. patent application Ser. No. 629,330 filed July 10, 1984, abandoned.

TECHNICAL FIELD

The present invention relates generally to fasteners, and particularly to the type of fastener used to attach upholstery fabrics with loops on their back surfaces to foam seat cushions.

BACKGROUND ART

A recently developed fastener assembly used to attach upholstery fabrics with loops on their back surfaces to foam seat cushions of the type used in automobiles includes a polymeric backing strip, a multiplicity of stems each secured at one end to and projecting from a first surface of the backing strip and having enlarged heads at their ends opposite the backing strip adapted to engage the loops on the upholstery material when the material is pressed against the heads, and an open porous permanent attachment layer attached to the surface of the backing strip opposite the stems. The fastener assembly is placed with its heads adjacent to the inner wall of a seat mold, a seat cushion is foamed in the mold, and the permanent attachment layer has sufficient open areas to afford movement of foam into it to permanently attach the fastener assembly to the newly foamed seat cushion.

This fastener assembly also typically includes a strip of steel sandwiched between the backing strip and the permanent attachment layer that provides means by which the fastener assembly can be magnetically held in a predetermined location against the inner wall of the mold in which the seat cushion is foamed. While the steel strip affords enough magnetic attraction to hold the strip in place prior to foaming, it presents a problem in a subsequent heat cure process during which the foam seat cushions removed from the mold are heated to about 125° C. (250° F.). This temperature causes longitudinal shrinkage in the polymeric backing strip, which shrinkage does not occur in the steel strip. Thus pieces of the thin steel strip either buckle within the fastener assembly giving it an uneven contour, or project from the ends of the fastener assembly and can cut the cushion, or the overlaying fabric, or even a person handling or sitting on the seat.

Additionally this fastener assembly has an elongate film layer overlying the heads and having longitudinal edge parts attached to the edges of the backing strip. This layer is positioned between the heads and the wall of the mold during the foaming process to prevent foam from moving into the spaces around the heads and stems which would reduce the ability of the heads to subsequently engage loops on the fabric. This film is adapted to then expose the heads during the heat cure process for the cushion by being meltable at a temperature below 125° C. While such melting exposes the heads and stems, it also coats them with the film material which can detract from the holding ability of the heads.

DISCLOSURE OF THE INVENTION

The present invention provides an elongate fastener assembly generally of the type described above which has a magnetically attractable temporary attachment layer that will not significantly project from the ends of the fastener assembly or cause it to buckle after the fastener assembly has undergone the heat cure process for the cushion.

According to the present invention there is provided an elongate fastener assembly comprising a flexible polymeric backing strip, a multiplicity of stems each secured at one end to the backing strip and projecting generally normally to one of its major surfaces and having enlarged heads at their ends opposite the backing strip adapted to engage loops on materials pressed against the heads, and an open porous permanent attachment layer attached to the major surface of the backing strip opposite the stems which has sufficient open area to afford movement of foam into the permanent attachment layer to permanently attach the fastener assembly to a foamed article.

The fastener assembly also has a temporary attachment layer comprising ferromagnetic material sandwiched between the second major surface of the backing and the attachment layer, which temporary attachment layer is adapted to be attracted by magnets to temporarily hold the fastener assembly in position during the foaming process. In the present invention this temporary attached layer is improved in that it comprises a polymeric bonding material (e.g. comprising vinyl or an elastomer) containing ferromagnetic particles (e.g. iron), which bonding material exhibits essentially the same shrinkage as the backing strip when the assembly is exposed to temperatures around 125° C. so that the temperatures resulting from the heat cure process for seat cushions will not cause a substantial relative change in length between the backing strip and the temporary bonding layer and will not cause the backing strip to buckle.

Additionally the elongate fastener assembly includes an elongate film cover means overlying the heads and having longitudinal edge parts attached along the sides of the backing strip, which film cover means is adapted to expose the heads upon the application of heat. As is claimed in U.S. patent application Ser. No. 629,331 filed July 10, 1984, this film cover means is improved in that it comprises two longitudinal film portions, each portion being sufficiently heat shrinkable in the transverse direction so that upon application of such heat, it will shrink towards the edge parts to expose the heads. This film layer means can comprise either a single longitudinal sheet of film longitudinally perforated generally along its center line to define the two portions so that the sheet separates along the perforations to afford transverse shrinking of the portions; or can comprise two separate sheets of film having overlapping portions opposite their edge parts.

BRIEF DESCRIPTION OF DRAWING

The present invention will be more thoroughly explained with reference to the accompanying drawing in which like numbers refer to like parts in the several views, and wherein.

DESCRIPTION OF THE PREFERRED EMBODIMENT

Figure 1:
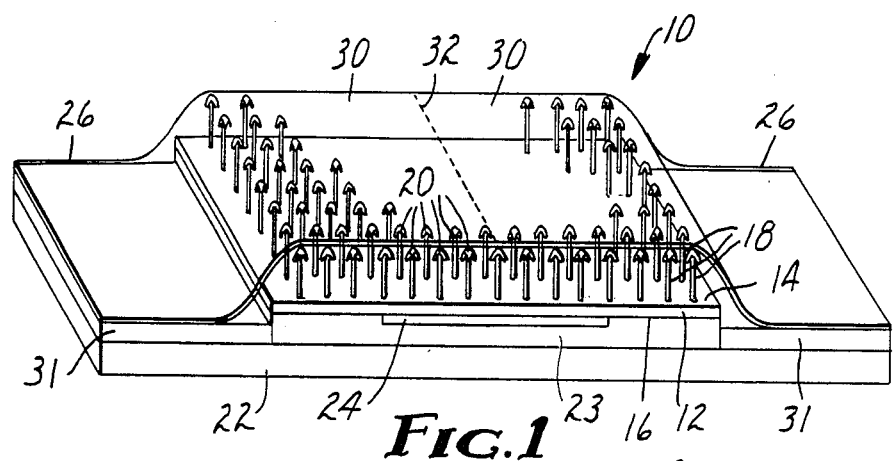
FIG. 1 is a perspective fragmentary view of a fastener assembly according to the present invention.

Referring now to FIG. 1 of the drawing, there is shown an elongate fastener assembly according to the present invention, generally designated by the reference numeral 10.

Generally, like the prior art fastener assemblies, the elongate fastener assembly 10 comprises (1) a flexible polymeric backing strip 12 having first and second major surfaces 14 and 16; (2) a multiplicity of stems 18 each secured at one end to the backing strip 12, projecting generally normally from its first surface 14 of the backing strip 12, and having enlarged heads 20 at their ends opposite the backing strip 12 adapted to engage loops on materials pressed against the heads; (3) an open porous permanent attachment layer 22 attached to the second major surface 16 of the backing strip 12 by a layer of adhesive 23, which permanent attachment layer 22 has sufficient open area to afford movement of foam into it to permanently attach the fastener assembly to a foamed article; (4) a temporary attachment layer 24 comprising ferromagnetic material sandwiched between the second major surface 16 of the backing strip 12 and the permanent attachment layer 22, which temporary attachment layer 24 is adapted to be attracted by magnets to temporarily hold the fastener assembly in position during a foaming process; and (5) an elongate film cover means or film portions 30 overlying the heads 20 and having longitudinal edge parts 26 attached along the edges of the backing strip 12 by bonding layers 31, which film layer means is adapted to expose the heads 20 upon the application of sufficient heat.

Unlike the prior art fastener assemblies of this type, however, the temporary attachment layer 24 of the strip material 10 is improved in that it comprises ferromagnetic particles dispersed in a polymeric bonding material, which bonding material may or may not have generally the same coefficient of thermal expansion as the backing strip 12, but in either event exhibits essentially the same shrinkage as the backing strip 12 when the backing strip 12 shrinks (apparently due either to stress relaxation or compression) during exposure to temperatures around 125° C. While the temporary attachment layer 24 appears to shrink with the backing strip 12, we theorize that it may be compressed by the backing strip 12 without distorting the fastener assembly 10. Thus such temperatures which are employed in the seat forming process will not cause a substantial relative change in length between the backing strip 12 and the temporary bonding layer 24.

Also, unlike the prior art fastener assemblies of this type, the film cover means in the fastener assembly 10 according to the present invention is improved in that it comprises two longitudinal film portions 30, each portion 30 being sufficiently heat shrinkable in the transverse direction so that upon application of said heat in the seat forming process it will shrink towards the edge parts 26 by which it is fastened to expose the heads 20.

Figure 2:
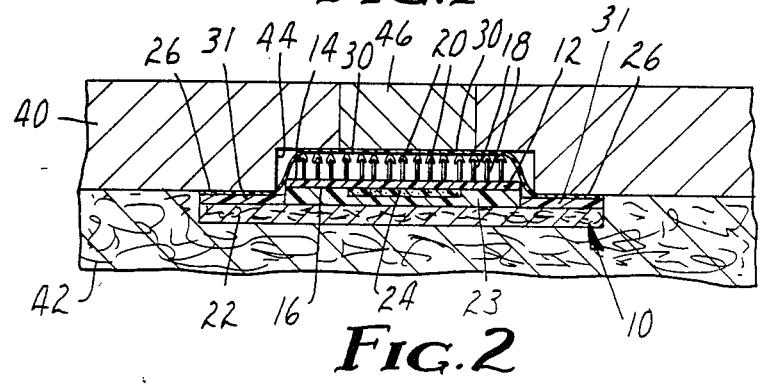
FIG. 2 is a reduced sectional view of the fastener assembly of FIG. 1 being magnetically held in a fragment of a mold used to mold seat cushions.
Figure 3:
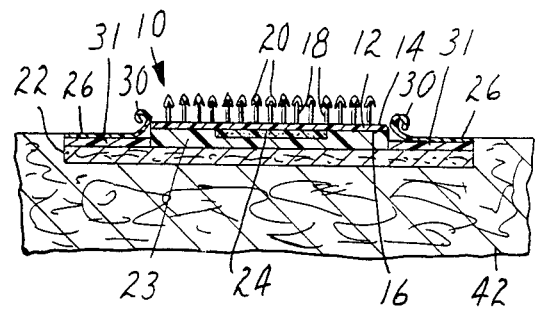
FIG. 3 is a reduced sectional view of the fastener assembly of FIG. 1 shown attached to a foam cushion with a film layer of the assembly shrunk away from over heads on the fastener by a heat cure process for the cushion.

As illustrated in FIGS. 1 and 2, the film cover means comprises a single longitudinal sheet of film having perforations 32 generally along its center line to define the two portions 30; the sheet being separable along the perforations 32 to afford transverse shrinking of each portion 30, to the position shown in FIG. 3. The bonding layers 31 attaching the edge parts 26 of the sheet of film to the permanent attachment layer 22 may be extensions of the layer of adhesive 23 as described in our U.S. patent application Ser. No. 629,330, but alternatively, as illustrated, may be thin layers of pressure-sensitive adhesive or hot melt adhesive which afford a thinner and more flexible fastener assembly; the most important aspect of those bonding layers 31 being that they firmly anchor the edge parts 26 of the sheet of film when it is heat shrunk from over the heads 20.

Figure 4:
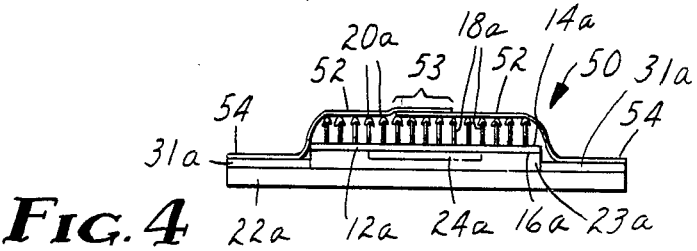
FIG. 4 is an end view of an alternate embodiment of the fastener assembly according to the present invention.

Alternatively, as illustrated for an alternate embodiment for a strip material 50 according to the present invention shown in FIG. 4 (wherein all parts of the strip material 50 that are the same as the parts of the strip material 10 are identified by the same reference numerals to which have been added the suffix "a") the film cover means can comprise two separate sheets 52 of the film having overlapping portions 53 opposite edge parts 54 by which the sheets are attached along the longitudinal edges of the backing strip 12a by the bonding layers 31a.

Preferably the backing strips 12 or 12a with the attached stems 18 or 18a and heads 20 or 20a are made in accordance with U.S. Pat. No. 4,454,183 (incorporated herein by reference), and particularly in accordance with the embodiment described with references to FIG. 7 of that patent which is made by a method described in U.S. Pat. No. 4,290,832 (also incorporated herein by reference). Alternatively, however, an integrally molded structure providing a backing strip, stems and heads could be used.

The permanent attachment layer 22 or 22a is preferably of fine denier polypropylene fibers (e.g. 3 to 4 denier fibers 7.6 to 10 centimeters (3 to 4 inches) long) that have been formed into a nonwoven mat and needled together to provide a strong porous structure (e.g. 0.2 centimeter (0.080 inch) thick by 4.5 centimeters (1.75 inch) wide) with a substantial percentage of open area to permit the inflow of foam.

As one example, the ferromagnetic material in the temporary attachment layer 24 or 24a may be iron particles, such as the gritty iron particles commercially designated type T−50+100 commercially available from Peerless Metal powder Company, Detroit, Mich., and the polymeric bonding material in which the iron particles are dispersed may be formed from a mixture of vinyl (which has about the same coefficient of thermal expansion as the backing strip), plasticizer and solvent such as the following mixture wherein all parts are parts by weight. A dry mixture is made from 100 parts of an emulsion grade polyvinyl chloride resin, 16 parts of butyl methacrylate acrylic resin, 37 parts of a compatible polymeric plasticizer and 5 parts of a compatible heat stabilizer. One part of this dry mixture is then combined with 5 parts of iron particles, and that combination is mixed with sufficient parts of a solvent consisting of 46% xylene, 34% diisobutyl ketone and 20% mineral spirits to produce a coating mixture having a viscosity of about 4000 centipose. The coating mixture is coated on a suitable release liner, dried in an oven with zones of increasing temperature from about 65° to 205° C. and slit to provide a temporary attachment layer about 0.013 to 0.05 centimeter (0.005 to 0.020 inch) thick and about 1.3 centimeter (½ inch) wide.

As another currently preferred example, the ferromagnetic material in the temporary attachment layer 24 or 24a may be iron particles, such as the gritty iron particles commercially designated type T—100 commercially available from Peerless Metal Powder Company, Detroit, Mich.; and the polymeric bonding material in which the iron particles are dispersed may be formed from a mixture of an A-B-A type copolymer elastomer and solvent such as the following mixture wherein all parts are parts by weight. A mixture is made from 100 parts of the A-B-A type copolymer elastomer commercially designated "Krayton 1101" and available from Shell Chemical Co., 300 parts toluene and 1000 parts of iron particles. That mixture is coated on a suitable release liner, dried in an oven with zones of increasing temperature from about 65° to 95° C. and slit to provide a temporary attachment layer about 0.036 to 0.04 centimeter (0.014 to 0.016 inch) thick and about 1.3 centimeter (½ inch) wide. Such a temporary attachment layer 24 or 24a does not have the same coefficient of thermal expansion as the backing strip 12 or 12a, but apparently has sufficient voids, is sufficiently elastic, and adheres sufficiently to the backing strip 12 or 12a to be compressed by shrinkage of the backing strip 12 or 12a when it is exposed to temperatures around 125° C. so that the fastener assembly 10 or 50 will not be distorted by the presence of the temporary attachment layer 24 or 24a.

Alternatively, it is expected the temporary attachment layer could be formed through the use of hot melt mixing equipment, such as an extruder, or the layer of adhesive 23 or 23a could be used to hold the iron particles in place, or the iron particles could be distributed in a matrix of fused polymeric material such as a polyolefin (which would have about the same coefficient of expansion as the backing strip 12 or 12a) and produce similar results.

The layer of adhesive 23 or 23a that bonds the backing strip 12 or 12a, temporary attachment layer 24 or 24a and permanent attachment layer 22 or 22a together is preferably of a thermoplastic resin of the polyolefin type which can be applied to these parts between nip rollers, one of which rollers is notched to receive the heads 20 or 20a and stems 18 or 18a.

Strips (not shown) of a foam material (e.g. about 0.08 centimeter (1/32 inch) thick, 1 centimeter (⅜ inch) wide strips of 2.7 kilogram (6 pound) polyurethane foam) may optionally be adhered in positions flanking the backing strip 12 or 12a between the bonding layers 31 or 31a and the sheet portions 30 or sheets 52 to provide additional gasketing for the fastener assembly 10 or 50 against the walls of a mold, should that be desired.

The sheet portions 30 (FIG. 1) or sheets 52 (FIG. 4) of film that provide the film cover means are preferably formed of a biaxially oriented prestressed polyvinyl chloride film 0.0025 centimeter (0.001 inch) or less thick, such as that commercially designated "Krystal Tite" shrink film type T144 or Type T-111 which film can be oriented so that it will shrink transversely of the fastener assembly 10 by about 60% when heated to less than about 125° C. This film, when unrestrained, would also shrink longitudinally of the strip assembly by about 40%, however attachment of the film along the backing strip 12 or 12a by the bonding layers 31 or 31a will prevent such shrinkage during such heating without causing buckling of the fastener assembly 10.

In use the fastener assembly 10 (as illustrated in FIG. 2) is positioned with the film portions 30 against the wall of a mold 40 in which a seat 42 is to be foamed with the stems 18 and heads 20 positioned in a groove 44 in that wall adapted to receive them, and the fastener assembly 10 temporarily held in place in the groove 44 by magnetic attraction between the iron particles in the temporary attachment layer 24 and a source of magnetism such as a magnet 46 in the wall of the mold 40. The mold 40 is then closed and filled with foam to form the seat 42, with the foam entering the porous permanent attachment layer 22 to secure the fastener assembly 10 in the seat with its heads 20 and their covering film portions 30 at the outer surface of the seat 42. During formation of the seat the film portions 30 insure that foam does not flow around the stems 18 and under the heads 20 to restrict their subsequent engagement with loops on a fabric covering for the seat 42 (not shown). After the foam seat 42 is formed, it is removed from the mold 40 and sent through a heat curing process at about 125° C., during which process the film portions 30 separate at the perforations 32 and shrink back from over the heads 20 to expose them for subsequent engagement with the loops on the fabric used to cover the seat 42 as is shown in FIG. 3. The fastener assembly 10 will also shrink including in the longitudinal direction, however, the temporary attachment layer 22 and backing strip 12 will shrink or be compressed at about the same rate, thereby precluding any projection of the temporary attachment layer 24 from the ends of the backing strip 12 or bending of the backing strip 12 as would occur if the temporary attachment layer 24 were of solid metal.

We claim:

1. In an elongate fastener assembly comprising a polymeric backing strip having first and second major surfaces;

a multiplicity of stems each secured at one end to said backing strip, projecting generally normally to the first surface of said backing strip, and having enlarged heads at their ends opposite said backing strip adapted to engage loops on materials pressed against said heads;

an open porous permanent attachment layer atached to the second major surface of said backing strip, said permanent attachment layer having sufficient open areas to afford movement of foam into said permanent attachment layer to permanently attach said fastener assembly to a foamed article; and a temporary attachment layer comprising ferromagnetic material sandwiched between the second major surface of said backing and said attachment layer, said temporary attachment layer being adapted to be attracted by magnets to temporarily hold said fastner assembly in position during the foaming process;

the improvement wherein the temporary attachment layer comprises ferromagnetical particles dispersed within a polymeric bonding material, said bonding material exhibiting essentially the same shrinkage as said backing strip when said fastener assembly is exposed to temperatures around 125° C., so that the temperatures resulting from the foaming process will not cause a substantial relative change in length between the backing strip and the temporary attachment layer.

2. An elongate fastener according to claim 1 wherein said binder comprises vinyl material and said ferromagnetic material is iron particles.

3. In an elongate fastener assembly comprising a polymeric backing strip having first and second major surfaces:
- a multiplicity of stems each secured at one end to said backing strip, projecting generally normally to the first surface of said backing strip, and having enlarged heads at their ends opposite said backing strip adapted to engage loops on materials pressed against said heads;
- an open porous permanent attachment layer attached to the second major surface of said backing strip, said permanent attachment layer having sufficient open areas to afford movement of foam into said permanent attachment layer to permanently attach said fastener assembly to a foamed article; and
- a temporary attachment layer comprising ferromagnetic material sandwiched between the second major surface of said backing and said attachment layer, said temporary attachment layer being adapted to be attracted by magnets to temporarily hold said fastener assembly in position during the foaming process;
- the improvement wherein the temporary attachment layer comprises ferromagnetical particles dispersed within a polymeric bonding material, said bonding material having generally the same coefficient of thermal expansion as said backing strip and exhibiting essentially the same shrinkage as said backing strip when said fastener assembly is exposed to temperatures around 125° C., so that the temperatures resulting from the foaming process will not cause a substantial relative change in length between the backing strip and the temporary attachment layer.

4. An elongate fastener according to claim 3 wherein said binder comprises vinyl material and said ferromagnetic material is iron particles.

* * * * *